(12) United States Patent
Pinson, III

(10) Patent No.: US 8,401,960 B2
(45) Date of Patent: Mar. 19, 2013

(54) ONLINE CREDIT ESCROW SERVICE

(76) Inventor: Walter H. Pinson, III, Ashburn, VA (US)

( * ) Notice: Subject to any disclaimer, the term of this patent is extended or adjusted under 35 U.S.C. 154(b) by 270 days.

(21) Appl. No.: 12/379,180

(22) Filed: Feb. 13, 2009

(65) Prior Publication Data

US 2009/0228392 A1 Sep. 10, 2009

Related U.S. Application Data

(60) Provisional application No. 61/064,428, filed on Mar. 5, 2008.

(51) Int. Cl.
*G06Q 40/00* (2012.01)
(52) U.S. Cl. ............................................. 705/38; 705/35
(58) Field of Classification Search ................... 705/39, 705/38, 35
See application file for complete search history.

(56) References Cited

U.S. PATENT DOCUMENTS

| | | | |
|---|---|---|---|
| 5,826,241 A | 10/1998 | Stein et al. | |
| 6,173,272 B1 | 1/2001 | Thomas et al. | |
| 6,520,409 B1 | 2/2003 | Mori et al. | |
| 6,529,885 B1 | 3/2003 | Johnson | |
| 6,532,450 B1 | 3/2003 | Brown et al. | |
| 6,704,714 B1 | 3/2004 | O'Leary et al. | |
| 2002/0038277 A1 | 3/2002 | Yuan | |
| 2003/0078881 A1 | 4/2003 | Elliott et al. | |
| 2003/0135461 A1 | 7/2003 | Brown et al. | |
| 2003/0149647 A1 | 8/2003 | Youngblood, Jr. | |
| 2004/0019560 A1 | 1/2004 | Evans et al. | |
| 2004/0193542 A1 | 9/2004 | Brown et al. | |
| 2005/0055319 A1 * | 3/2005 | Monsen et al. | 705/401 |
| 2005/0131816 A1 | 6/2005 | Britto et al. | |
| 2005/0144128 A1 | 6/2005 | McCoppin et al. | |
| 2006/0080236 A1 | 4/2006 | Welker et al. | |
| 2006/0085331 A1 * | 4/2006 | Imrey et al. | 705/39 |
| 2006/0085332 A1 | 4/2006 | Imrey et al. | |
| 2006/0218067 A1 | 9/2006 | Steele | |
| 2006/0259420 A1 | 11/2006 | Schaffer et al. | |
| 2006/0273165 A1 | 12/2006 | Swift et al. | |

FOREIGN PATENT DOCUMENTS

| | | |
|---|---|---|
| JP | 2003-67583 | 3/2003 |
| JP | 2004-118349 | 4/2004 |
| WO | WO 2004/029850 A2 | 4/2004 |

OTHER PUBLICATIONS

Solomon, Kennith, "Consumer dispute verification"; Credit World, v82n4, pp. 28-30; ISSN: 0011-1074; Journal Code: CW.*
PR_Newswire; "Credit Reporting Agency will pay $300,000 to settle complaints"; 1210A1074, Dec. 10, 1991, NW file 649.*
Mondaq Business Briefing; "Fair Credit Reporting Act Amendments: A summary and Analysis"; 0020524271, Jan. 22, 2004.*
"National Revenue Corporation," NationalRevenue.com http://www.nationalrevenue.com/company/approach.html, 2 pages printed from the Internet Jan. 2, 2007.

* cited by examiner

*Primary Examiner* — Lalita M Hamilton
*Assistant Examiner* — Edward Chang
(74) *Attorney, Agent, or Firm* — Cloudigy Law PLLC

(57) ABSTRACT

The online credit escrow service is a method of protecting the credit of debtors who are paying back their debts. The method involves a third party as an intermediary between the debtor and the debt collector. The debtor delivers money to a third party that stores the money in an escrow account. The third party then contacts the debt collector and notifies them that the debt has been paid, but payment will not be transferred to the debt collector until the credit rating of the debtor has been updated to reflect the payment. When the debt collector updates the debtor's credit rating the payment for the debt is sent to the debt collector.

14 Claims, 3 Drawing Sheets

ONLINE CREDIT ESCROW SERVICE

CROSS-REFERENCE TO RELATED APPLICATION

This application claims the benefit of U.S. Provisional Patent Application Ser. No. 61/064,428, filed Mar. 5, 2008.

BACKGROUND OF THE INVENTION

1. Field of the Invention

The present invention relates to credit systems, and more particularly, to an online credit escrow service business method and system of protecting the credit of debtors who are paying back their debts.

2. Description of the Related Art

In order to facilitate the sale of goods and services, merchants often provide credit accounts to their customers. A credit account may also be generated by a "point of sale" transaction whereby a consumer tenders a negotiable instrument, such as a check, that is insufficient to cover the required amount of the transaction. These merchant/creditors allow the consumers/debtors to make purchases on credit, rather than using cash. Consumers incur debt with each credit purchase, which may be repaid over time according to terms and conditions generally dictated by the merchant/creditor. Credit accounts are frequently set up to offer a customer one or more lines of credit, typically including at least one revolving credit line in which the customer may choose either to pay the full amount of debt owed on his account by a specified date or defer payment of at least a portion of the debt to a later date. Credit accounts may also include a loan for a specific purchase, such as an installment loan, or a line of credit from a retailer. The creditor typically charges the customer interest or finance charges for deferred payments during the period of deferral.

The creditor generally establishes a credit limit for each credit account, defining the maximum amount of credit available to the customer for making purchases at any given time. When a customer makes a credit card purchase, the amount of credit available to the customer, often called the available balance, is reduced by the amount of the purchase, and the amount of debt currently owed by the customer, often called the outstanding balance, is increased by the amount of the purchase.

When a consumer (debtor) fails to pay "as agreed" on a credit card, revolving credit account, or installment loan offered by the creditor, the creditor often submits a record of the consumer's default to one or more credit reporting agencies. After a period of time with no payment from the consumer, the service provider is required to "charge-off" the balance owed by the consumer as a loss. The "charge-off" typically is also submitted to the credit reporting agencies for inclusion in the debtor's credit history file.

Creditors often have difficulty in recovering charged-off debt because the terms they offer to the consumer are often unduly onerous. Moreover, sometimes creditors renege on their promise to favorably update a consumer's credit history file maintained by one or more of the commonly used credit reporting agencies. Given the borderline unscrupulous tactics used by creditors and their collection agencies, the consumer's risk in accepting new terms to pay an otherwise "charged off" debt far exceeds his/her reward for doing so. A debtor who, without professional assistance, attempts to negotiate payment terms with a creditor is likely to end up with unfavorable payment terms and broken promises on the part of the creditor to accurately update the debtor's credit file.

In addition to debtor-side risks, the creditor also enters into a payment transaction with some risk. For example, a consumer (the debtor) might refuse to pay or submit an instrument with insufficient funds (NSF) to pay the agreed upon amount to the creditor after the creditor has updated the credit report data in favor of the consumer. In other cases, the debtor might submit payment to the creditor while simultaneously issuing a stop payment order on the payment instrument. An unwary creditor may have relied on the payment instrument in updating the credit report data only to discover that the creditor has been duped into providing a clean credit report on behalf of the consumer.

To overcome the aforementioned problems, it would be desirable to protect the interests of both debtor and creditor participating in a payment transaction to liquidate outstanding debt balances.

Thus, an online credit escrow service solving the aforementioned problems is desired.

SUMMARY OF THE INVENTION

The online credit escrow service provides a method of protecting the credit record of debtors who are paying back their debts. The method involves a third party service provider as an intermediary between the debtor and the debt collector. The debtor delivers money to the third party service provider, who stores the money in an escrow account. The third party service provider then contacts the debt collector and notifies them that the debt has been paid, but payment will not be transferred to the debt collector until the credit rating of the debtor has been updated to reflect the payment. When the debt collector updates the debtor's credit rating, the payment for the debt is sent to the debt collector.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The online credit escrow service provides a method of protecting the credit record of debtors who are paying back their debts. The method involves a third party as an intermediary between the debtor and the debt collector. The debtor delivers money to a third party. The third party stores the money in an escrow account. The third party then contacts the debt collector and notifies them that the debt has been paid, but payment will not be transferred to the debt collector until the credit rating of the debtor has been updated to reflect the payment. When the debt collector updates the debtor's credit rating, the payment for the debt is sent to the debt collector.

Figure 1:
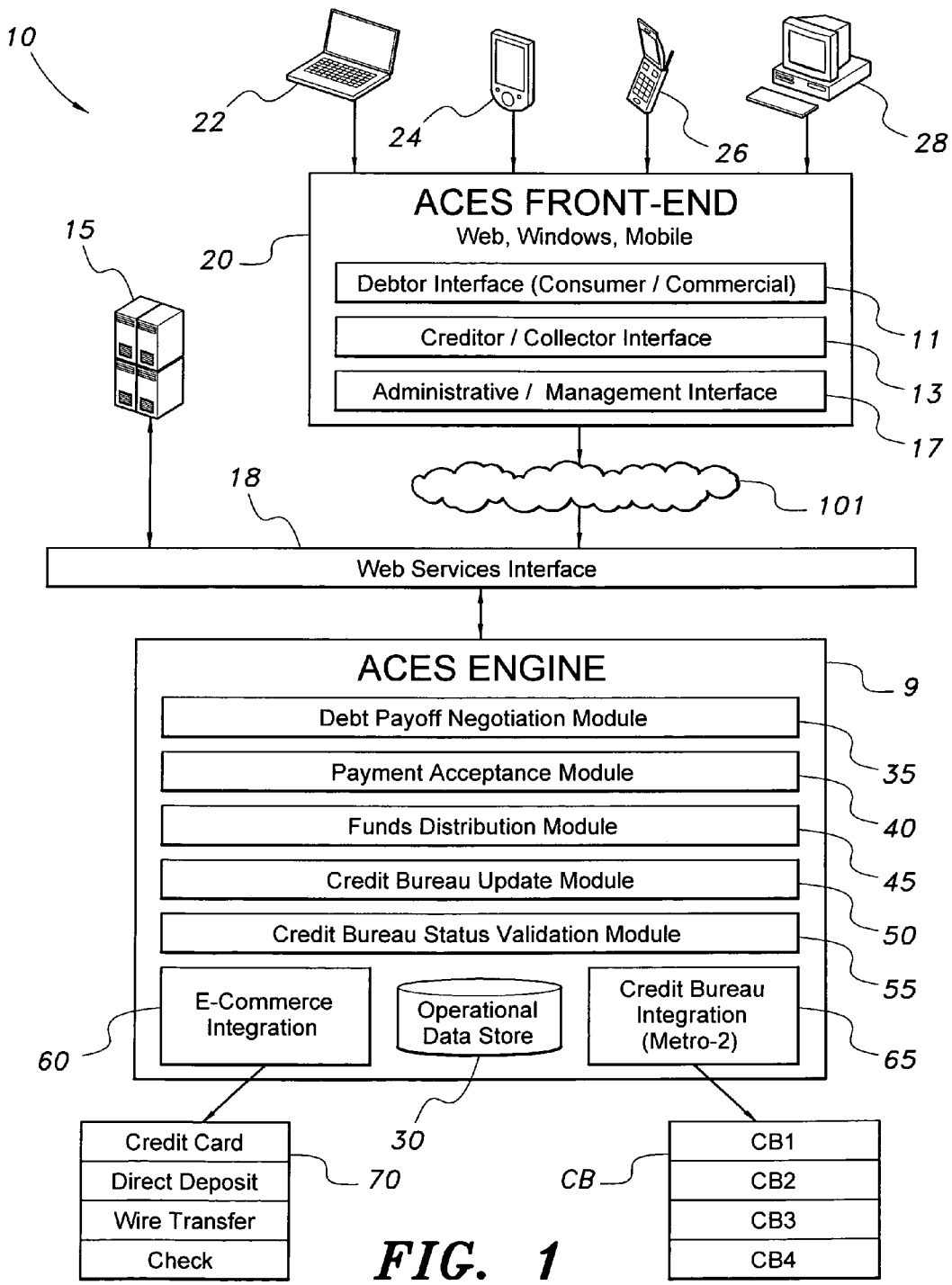
FIG. 1 is a block diagram of the system architecture of an online credit escrow service according to the present invention.

With reference now to the figures, FIG. 1 depicts a network of data processing systems configured in a logical architecture capable of implementing the automated credit escrow service (ACES). The system 10 may be network-based and deliver a plurality of hosted applications in a one-to-many architecture. Server 15 may be connected to a Web Services Interface 18, which can communicate via a network 101. Network 101 may include permanent connections, such as wire or fiber optic cables, or temporary connections made through telephone or wireless communications.

As depicted in FIG. 1, network 101 is the Internet, and the service (referred to in the drawings as ACES) has front end components 20 connected to the network 101, the front end components 20 being accessible to a variety of client devices, such as laptop computer 22, personal digital assistant (PDA) 24, cell phone 26, or desktop PC 28. In the depicted example, the service's engine 9 is also accessible to server 15. The service's engine 9 may execute on server 15, or on a plurality of servers in a distributed processing environment, which may include additional servers, clients, routers, or the like. An operational data store 30 is also provided for storage of information/programs required by the service's engine 9 for processing.

The processing environment of the system 10 may include the Internet, with access to a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), or the like. Moreover, the system 10 may also include a number of different types of networks, such as, for example, an intranet, a local area network (LAN), or a wide area network (WAN). Server/client communication via wireless communication links is also contemplated. Network-enabled phone 26 may execute the front-end client software, such as debtor interface 11, via a connection to network 101 through an appropriate wireless link.

Similarly, PDA 24 may be used by a collector COL and may execute creditor/collector interface 13 of the front end for access to creditor/collector features of system 10 through a wireless link. In a further example, PC 28 may be used by an administrator of the system 10 and may execute administrative/management interface 17 of the front end for access to administrative features of the system 10.

The service may be implemented on a variety of hardware platforms, i.e., FIG. 1 is intended as an exemplary computing environment and not as an architectural limitation of the service.

In addition to being capable of implementation on a variety of hardware platforms, the service may be implemented in a variety of software environments. A typical operating system may be used to control program execution within each processor/computer of the system 10. For example, one device may run a UNIX® operating system, while another device runs a simple Java®. runtime environment ORE) or Java® virtual machine (JVM).

Moreover, a representative computer platform may include a browser, which is a well known software application for accessing hypertext documents in a variety of formats, such as graphic files, word processing files, Extensible Markup Language (XML), Hypertext Markup Language (HTML), or the like.

The service may be implemented on a variety of hardware and software platforms, as described above. More specifically, however, the service is directed to providing a method and system in electronic commerce for protecting the credit record of debtors who are paying back their debts by releasing escrowed payments only if the debtor's credit file has been appropriately updated.

Figure 2:
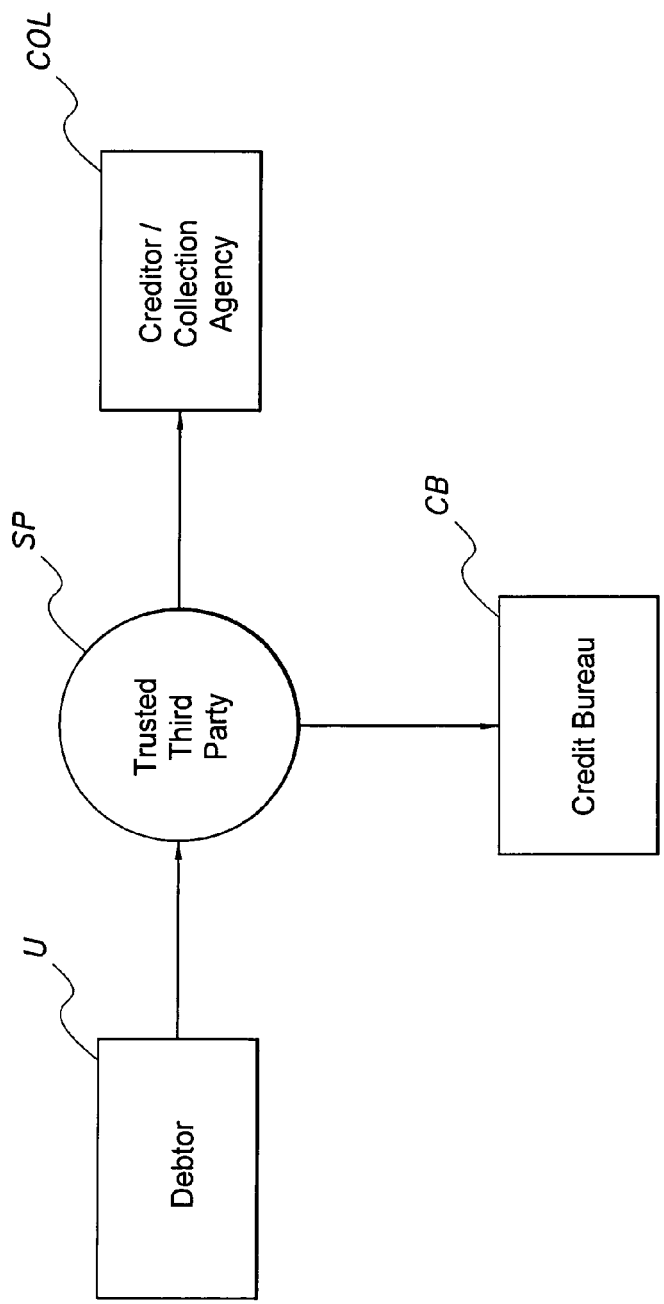
FIG. 2 is a block diagram showing parties participating in the online credit escrow service according to the present invention.

With reference now to FIG. 2, a block diagram depicts the parties that are involved in the Automated Credit Escrow Service system 10. A debtor U transfers funds to a trusted third party SP. The goal of the debtor U is to pay the debt and have a credit bureau update file information to reflect the correct status of the debt, and/or completely remove the debt information from the credit bureau file. The trusted third party SP operates system 10. The operational goal of the system 10 is to facilitate complete transactions between creditor and debtor and to ensure that both parties are receiving what they have agreed upon. The trusted third party SP holds the funds in escrow.

A creditor/debt collector COL communicates with the trusted third party service provider SP of system 10, and also communicates with a credit bureau CB. The goal of the credit/collection agency COL is to collect debt and avoid any fines or penalties resulting from mishandling or misreporting consumer or commercial credit information. The goal of the credit bureau CB is to report consumer and commercial credit information as correctly and timely as possible. As shown in FIG. 2, data may flow between the credit bureau CB and trusted third party SP, as well as between the credit bureau CB and creditor/collection agency COL. As shown in FIG. 1, a credit bureau integration module 65 is included in the service's engine 9 of system 10 in order to facilitate communication with a plurality of credit bureaus CB (CB1, CB2, CB3, and CB4) to update the consumer's credit history file. While the well known Metro-2™ credit reporting module is shown, it is contemplated that any generic credit reporting module may be used by the service's engine 9 for the purpose of viewing and updating a consumer's credit history file.

Referring again to FIG. 1, financial services 70 represents a financial infrastructure of banks, electronic payment services, credit card services, etc., that are used generally available to the public for transacting commerce with legal tender. Debtor U, creditor COL, and system 10 may use financial services 70 via E-commerce integration 60 within the service's engine 9 as necessary or as appropriate to transact electronic payment (e-payment).

For example, at some point in time, the system 10 holds a payment from debtor U in escrow, i.e., a so-called escrowed payment. The escrowed payment is held in the custody of system 10 until a specified condition has been fulfilled, which, in the ordinary course of events, would be the successful accurate updating of U's credit history by credit bureau CB at the direction of creditor COL.

After trusted third party service provider SP verifies that the received credit report data are accurate, the system 10 releases the escrowed payment to creditor COL. As part of the entire transaction, the third party SP earns a fee by charging the debtor U, charging the creditor COL, or charging both debtor U and creditor COL. The debtor, the creditor, or both, may be private individuals, private institutions, public institutions, corporations, partnerships, cooperatives, or the like.

Depending upon the implementation, the credit report data may be data that is to be provided by the creditor COL, i.e., the present invention may also be applicable to escrow payments held in custody until the creditor provides data files to the system 10, the data files enabling the system 10 to accurately update and verify the debtor's credit file maintained by credit bureau CB.

To accomplish the payment transfers amongst the parties, it can be assumed that the parties have agreed to one or more specific payment methods, which would involve the use of financial services 70 in some manner. Acceptable payment methods may include, but are not limited to, credit card, direct deposit, wire transfer, check, or the like. The electronic transfers may occur over various types of networks, such as network 101.

To accomplish a transaction, all of the parties to the transaction may send and receive various types of communications, including electronic messages in various formats that are transmitted across various types of networks, such as telephone circuits or other types of networks, such as network 101. For example, when negotiating a transaction, service provider SP and creditor COL may exchange physical mail, electronic mail (e-mail), digital image files, or any other method known to one of ordinary skill in the art. It is contemplated that a debt payoff negotiation module 35 within the service's engine 9 can document negotiations between service provider SP and creditor COL on behalf of debtor U and, in some instances, may even offer suggested negotiation strategies based on parameters related to a specific transaction.

As another example, debtor U and/or creditor COL may register with the system 10 to create an account that is used to initiate a formal transaction via system 10. To do so, the system 10 preferably authenticates the account holder in some manner, i.e., the system 10 may authenticate the user at least partially electronically through credit bureau CB, credit card companies, or other institutions as necessary. A registered debtor may verify his/her payment record via records kept in database 30 of the system 10.

Moreover, the system 10 may provide electronic access to its services so that parties can create accounts and transact business with the system 10. For example, users may access the escrow service through the Internet using browser-type applications on clients, such as the clients shown in FIG. 1. The service may operate servers, similar to server 15, in order to provide Web pages allowing users to send and receive information from the service in a manner that is well known in the art. Although the service may process electronic payments and may conduct some of its business through Internet-based or Web-based applications, it should be understood that escrow service 10 may also accept payments and/or communications utilizing means other than the Internet, digital information services, or the like.

Figure 3:
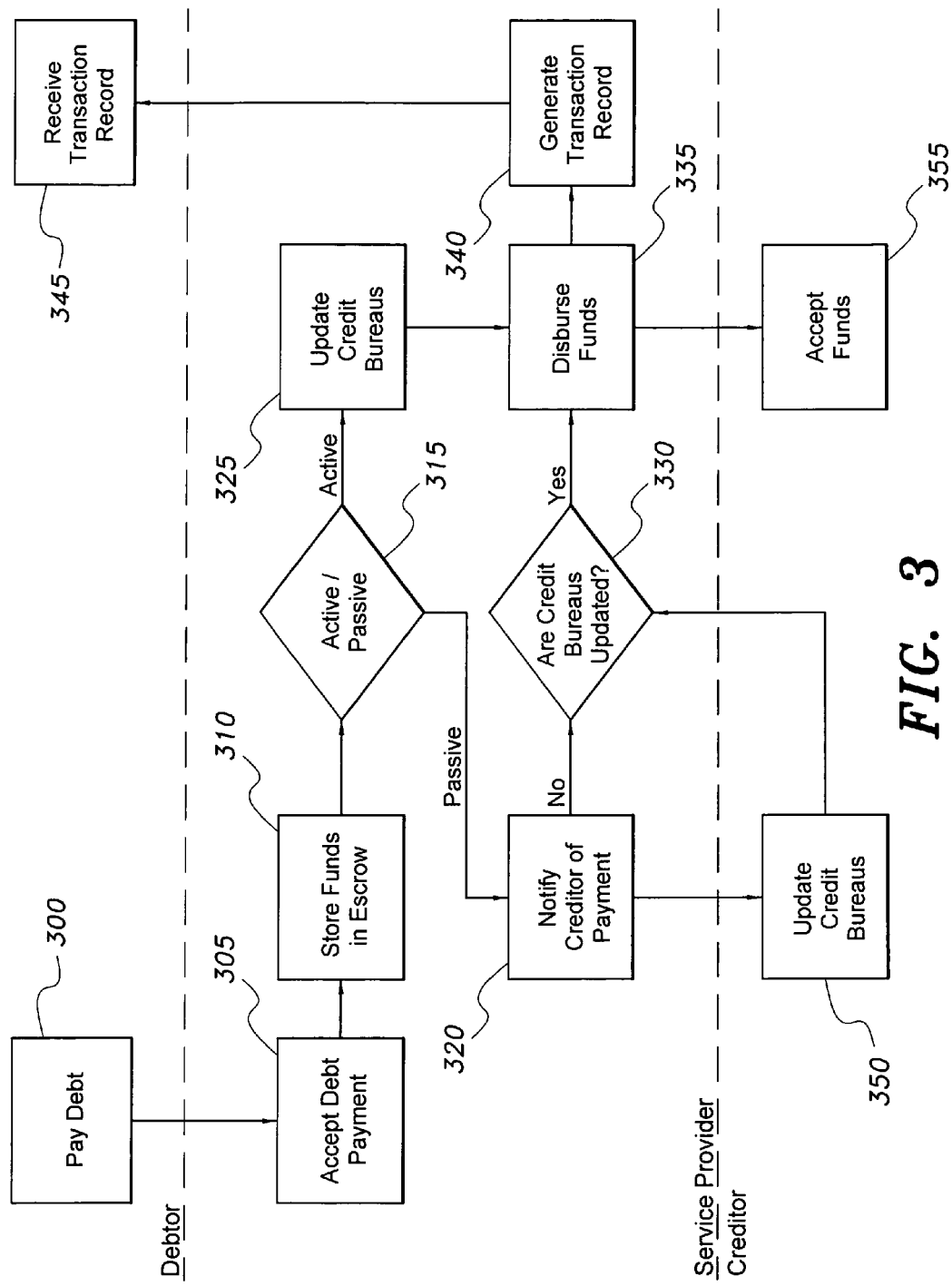
FIG. 3 is a block diagram showing process flow in an online credit escrow service according to the present invention.

With reference now to FIGS. 1 and 3, a flowchart depicts a process showing the operations or actions of the parties that are involved in a typical transaction utilizing the modules engine 9. The process begins at step 300 with the debtor U paying the debt into the system 10. At step 305, the service accepts the debt payment via engine payment acceptance module 40. At step 310 the service stores the debt payment in escrow. The service is capable of operating in an active mode or a passive mode. At step 315, a determination is made as to whether the service is in the active mode or the passive mode for the particular transaction underway. In the active mode, responsive to the escrow payment being made, the service may directly communicate with credit bureau CB using a credit bureau update module 50 to update applicable records in credit files associated with debtor U (step 325).

Disbursement of the funds to the creditor at step 335 is facilitated by a funds distribution module 45. At step 340 a transaction record is generated. Subsequently, at step 345 the transaction record is transmitted to the debtor. As shown in step 320, in the passive mode, responsive to the escrow payment being made, the service notifies the creditor COL of the escrowed payment and requests that creditor COL update applicable credit records associated with debtor U. At step 350, creditor COL updates the credit bureau files. At step 330, via credit bureau status validation module 55, the service periodically checks to see if the credit bureaus are updated, and if the credit bureaus have not been updated, the service repeats the notification step 320.

If the credit bureaus have been updated, then the funds are disbursed at step 335, the creditor accepts the funds at step 355, and a transaction record is generated at step 340. An agreement to use automated credit escrow service 10 may be done explicitly, or the parties may have agreed implicitly as it may have been required of all transaction that are conducted through the Web site owned by service provider SP.

The service reduces the risks of the parties by actively (directly) or passively (indirectly) assuring that the credit report data with respect to the particular debtor has been accurately updated. The service does not release the escrowed payment until it has verified that the credit report data accurately reflects the current transaction mediated by the escrow service 10.

When debtor U and creditor COL are both interacting with the service in a completely electronic manner, it is preferable for both debtor U and creditor COL to have been previously registered with the service in order to provide identity information, account information, and the like to the service. The transaction record generated at step 340 is preferably associated with some type of transaction identifier (ID) or other tracking code. The tracking code may be presented as necessary to be used by the system 10, or appropriate components in communication with the system 10.

It is important to note that while the online credit escrow service has been described in the context of a fully functioning data processing system, those of ordinary skill in the art will appreciate that the processes of the service are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, USB drives, CD-ROMs and transmission-type media, such as digital and analog communications links.

It is to be understood that the present invention is not limited to the embodiment described above, but encompasses any and all embodiments within the scope of the following claims.

I claim:

1. A computerized online credit escrow method, comprising the steps of:
   a server receiving data representative of an electronic payment from a computing device operated by a debtor;
   storing a payment value associated with the electronic payment in a payment database stored in non-transitory computer readable memory of the server;
   the server updating an escrow account database stored in the nontransitory computer readable memory of the server to reflect the payment value, the escrow account database having a total payment value stored therein;
   the server comparing the total payment value stored in the payment database against a total debt value stored in the escrow account database;
   determining whether the total payment value equals the total debt value;
   when the total payment value equals the total debt value, then the server performing the additional steps of:
   (1) transmitting a notification signal to a debt collector from the third party that a debt has been paid and that payment will not be transferred to the debt collector until a credit reporting agency credit record of the debtor has been accurately updated to reflect the payment, the total payment value representing funds being held in escrow by the third party;

(2) verifying that the debtor's credit record has been accurately updated by the debt collector to reflect the payment; and (3) releasing the funds held in escrow by the third party to the debt collector if the debtor's credit rating has been accurately updated by the debt collector to reflect the payment.

2. The computerized online credit escrow method according to claim 1, wherein the step of notifying the debt collector comprises transmitting a notification to a computing device accessible to the debt collector.

3. The computerized online credit escrow method according to claim 1, wherein verifying that the debtor's credit record has been updated comprises receiving debtor credit record information compiled by at least one credit bureau.

4. The computerized online credit escrow method according to claim 1, wherein the step of receiving the data representative of the electronic payment further comprises accepting electronic funds from the debtor selected from the group consisting of: credit card, direct deposit, wire transfer, check payments and combinations thereof.

5. The computerized online credit escrow method according to claim 1, further comprising the step of conducting payment negotiations with the debt collector on behalf of the debtor.

6. The computerized online credit escrow method according to claim 1, further comprising the steps of accepting and responding to administrative inputs initiated by an administrator via an administrative computing device.

7. The computerized online credit escrow method according to claim 1, further comprising the step of charging a utilization fee.

8. The computerized online credit escrow method according to claim 1, further comprising the steps of notifying the debt collector that the debt has been paid and that payment will not be transferred to the debt collector until a credit reporting agency credit record of the debtor has been accurately updated to reflect the payment, periodically checking to see if the credit record has been updated, and if the credit record has not been updated, repeating the notifying step.

9. The computerized online credit escrow method according to claim 1, further comprising the step of generating a transaction record.

10. A computer software product that includes a non-transitory storage medium readable by a processor, the non-transitory storage medium having stored thereon a set of instructions for performing an online credit escrow method, the instructions comprising:

(a) a first sequence of instructions which, when executed by the processor, causes the processor to receive data representative of an electronic payment from a debtor;

(b) a second sequence of instructions which, when executed by the processor, causes the processor to store a payment value associated with the electronic payment in a payment database stored in the non-transitory storage medium;

(c) a third sequence of instructions which, when executed by the processor, causes the processor to update an escrow account database stored in the non-transitory storage medium of the server to reflect the payment value, the escrow account database having a total payment value stored therein;

(d) a fourth sequence of instructions which, when executed by the processor, causes the processor to compare the total payment value stored in the escrow account database against a total debt value stored in the escrow account database and to determine whether the total payment value equals the total debt value;

(e) a fifth sequence of instructions which, when executed by the processor, causes the processor to transmit a notification signal to a debt collector from the third party when the total payment value equals the total debt value, the notification signal indicating that a debt has been paid and that payment will not be transferred to the debt collector until a credit reporting agency credit record of the debtor has been accurately updated to reflect the payment, the total payment value representing funds being held in escrow by the third party;

(f) a sixth sequence of instructions which, when executed by the processor, causes the processor to verify that the debtor's credit record has been accurately updated by the debt collector to reflect the payment; and (g) a seventh sequence of instructions which, when executed by the processor, causes the processor to release the funds held in escrow by the third party to the debt collector if the debtor's credit rating has been accurately updated by the debt collector to reflect the payment.

11. The computer software product as recited in claim 10, wherein the fifth sequence of instructions further comprises an eighth sequence of instructions which, when executed by the processor, causes the processor to transmit a notification to a computing device accessible to the debt collector.

12. The computer software product as recited in claim 11, wherein the sixth sequence of instructions further comprises a ninth sequence of instructions which, when executed by the processor, causes the processor to receive debtor credit record information compiled by at least one credit bureau.

13. The computer software product as recited in claim 12, further comprising a tenth sequence of instructions which, when executed by the processor, causes the processor to accept administrative inputs initiated by an administrator via an administrative computing device.

14. The computer software product as recited in claim 13, further comprising an eleventh sequence of instructions which, when executed by the processor, causes the processor to respond to the administrative inputs initiated by the administrator via the administrative computing device.

* * * * *